No. 856,729. PATENTED JUNE 11, 1907.
C. RYSTROM.
LOCK NUT.
APPLICATION FILED APR. 3, 1906.

Witnesses:
H. J. Slagle
E. C. Behel

Inventor:
Charles Rystrom,
By A. O. Behel
Atty.

THE NORRIS PETERS CO., WASHINGTON, D. C.

UNITED STATES PATENT OFFICE.

CHARLES RYSTROM, OF ROCKFORD, ILLINOIS.

LOCK-NUT.

No. 856,729.   Specification of Letters Patent.   Patented June 11, 1907.

Application filed April 3, 1906. Serial No. 309,660.

*To all whom it may concern:*

Be it known that I, CHARLES RYSTROM, a citizen of the United States, residing at Rockford, in the county of Winnebago and State of Illinois, have invented certain new and useful Improvements in Lock-Nuts, of which the following is a specification.

The object of this invention is to construct a lock-nut of coiled material having a central screw-threaded opening and in which the coils are turned axially one upon another, which changes the pitch of the thread, and in placing the nut in connection with a bolt, the coils must be alined, and in doing so sufficient friction contact will be exerted between the nut and bolt to hold the nut from accidental displacement.

Figure 1:
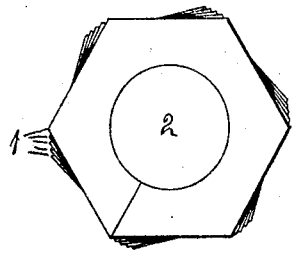
Figure 4:
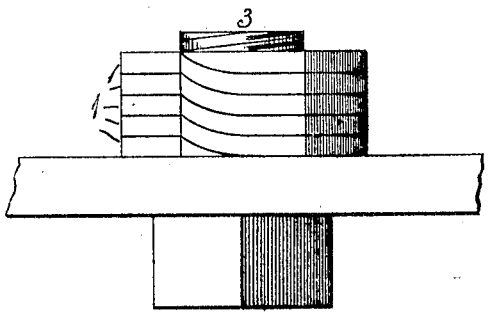
Figure 2:
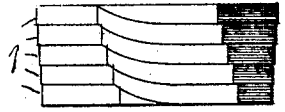
Figure 3:
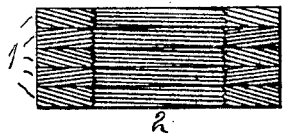
Figure 5:
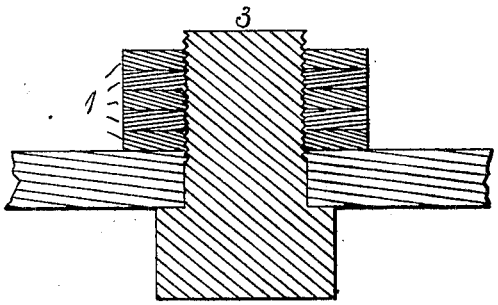

In the accompanying drawings. Figure 1 is a plan view of my improved lock nut before being applied to a bolt. Fig. 2 is an edge view. Fig. 3 is a lengthwise section of the lock nut. Fig. 4 is an edge view of the lock nut in connection with a bolt. Fig. 5 is a lengthwise section of the lock nut in connection with a bolt.

My improved lock nut is constructed by coiling bar material around a mandrel, then compressing the coils 1 and screw-threading the central opening 2, thus far the nut is of an old construction. The coils 1 are then twisted or turned axially one upon another as shown at Figs. 1, 2 and 3. This twisting action is in a forward direction, (that is to say, a direction to further coil the metal bar), and shifts the sections of thread formed in the different coils so that the threads of the successive coils are normally displaced or advanced in the direction of the circuit of the screw-thread of the nut lock, with a slight contraction of the screw-threaded bore.

The nut is placed on a bolt 3 in the usual manner. The thread of the first coil will readily take the thread of the bolt; while the thread of the bolt is taking the thread of the second coil, this coil will be gradually forced into the position it occupies before being twisted axially, and so on with each of the coils until the nut will appear as shown at Figs. 4 and 5. By this construction of lock-nut, each coil imparts an impinging influence upon the bolt, which can be varied by increasing or diminishing the axial twist given to the coils.

The frictional force exerted by the coils upon the bolt is sufficient to prevent the accidental displacement of the nut, but the nut can be taken off in the usual manner.

I claim as my invention.

1. A lock nut composed of a series of coils internally screw threaded, the threads of the several coils being normally advanced progressively in the direction of the circuit of the screw thread.

2. A nut-lock composed of a series of coils internally screw-threaded, the threads of some of the coils being normally advanced in the direction of the circuit of the screw thread.

3. A nut-lock composed of a series of coils internally screw-threaded, some of the coils being axially twisted in a forward direction to advance the threads of some of the coils in the direction of the circuit of the screw-thread.

CHARLES RYSTROM.

Witnesses:
A. O. BEHEL,
E. BEHEL.